March 12, 1968 T. H. PEARCE 3,372,894

TIRE BEADS AND METHODS OF MAKING SAME

Filed Nov. 5, 1965

Inventor:—
Thomas H. Pearce,
By Brown, Jackson, Boettcher & Dienner
Attys.

United States Patent Office 3,372,894
Patented Mar. 12, 1968

3,372,894
TIRE BEADS AND METHODS OF
MAKING SAME
Thomas H. Pearce, Niles, Mich., assignor to National-Standard Company, Niles, Mich., a corporation of Delaware
Filed Nov. 5, 1965, Ser. No. 506,498
3 Claims. (Cl. 245—1.5)

ABSTRACT OF THE DISCLOSURE

Tire beads of round wire disposed in superposed touching layers with the successive convolutions of the wire in the layers being in side by side touching relation, and in which the touching portions of the wire are homogeneously joined.

---

The present invention relates to tire beads for pneumatic tires and methods of making tire beads.

Tire beads today are conventionally made by winding insulated wire in successive convolutions in side-by-side relation and in a plurality of superposed layers of such convolutions of wire. The insulating material coating the wire is usually composed of uncured rubber and provides for retaining the wound wire in position in the wound bead. The tire beads are assembled with a tire carcass and other components of a tire, and the assembly then formed and cured to the desired tire configuration so that the bead rings become embedded in the completed tire. The art has also frequently employed strip or tape-like insulated material embodying a plurality of parallel or braided wires held together by insulating material or by light weight weft wires, and which strip or tape-like material is wound in successive overlapping convolutions to form a tire bead. Further the art has utilized wires layed in the form of a rope to define a bead for a tire.

The present invention comprehends the provision of a tire bead composed of a plurality of superposed layers of wire each comprising a plurality of successive convolutions of round wire in side-by-side relation with the several wires at least at their touching portions being joined to form a homogeneous bead to thus provide a bead of maximum strength for a given cross sectional area.

In certain of the aforementioned tire beads of the prior art, the convolutions of wire are held together by the insulating material which is of nominal mechanical strength and much less than that of the material of the wire. The insulating material comprises a portion of the total cross sectional area of the completed bead so that the insulating material affords little or no mechanical strength for the bead. One approach of the art to avoid the aforementioned disadvantage is to employ flat strip material wound in superposed layers but such approach is unsatisfactory in that strip material cannot by known heat treatment methods be provided with a tensile strength comparable to round wire so that for a given bead of desired tensile strength formed of strip material it must be of a cross-sectional area of an amount rendering the bead prohibitive or unsatisfactory for use in a pneumatic tire.

According to the present invention, wire of round cross-section is wound in layers in which each of the layers is composed of a plurality of convolutions in side-by-side abutting relation and in which the several convolutions at least at their touching portions are joined to form a homogeneous bead.

Preferred embodiments of the invention will be described in connection with the accompanying drawings in which.

Figure 1:
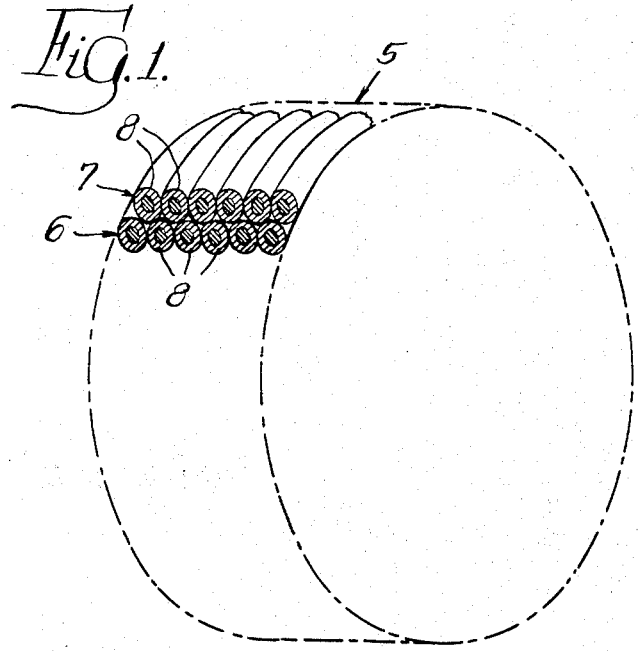
FIGURE 1 is a perspective view of one form of bead constructed in accordance with the present invention.
Figure 1A:
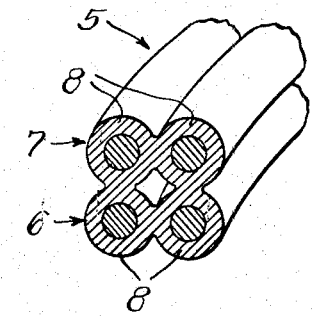
FIGURE 1A is an enlarged detail view of a portion of the bead of FIGURE 1.

Referring now to FIGURES 1 and 1A there is shown a tire bead 5 comprising a pair of superposed layers 6 and 7 in which each layer comprises wire 8 layed in successive convolutions in side-by-side relation. The convolutions of the layers, as shown, are disposed in superposed array and in touching relation. The wire 8 may be drawn from any suitable supply and wound by conventional methods to form an annulus which may comprise any desired number of layers with any desired number of convolutions in each of the layers to form a bead of required cross-sectional configuration and tensile strength. The wire 8 may, for example, be composed of currently known round steel wire suitable for a bead which may be coated, by way of example, with tin, zinc or copper or other suitable plastic material characterized so that when heated, and after winding of the wire to the form of a bead, to provide a homogeneous assembly of the several wires joined at least at their touching portions. A solid ring is thus formed which then may be insulated with suitable material such as raw rubber for incorporating the bead in a tire by conventional tire forming and curing expedients. As shown in FIGURE 2A the touching portions of the convolutions of the wire 8 are joined homogeneously by the coating material. The coating material preferably is of low melting temperature to facilitate joining of the convolutions and layers in low temperature furnaces.

Figure 2:
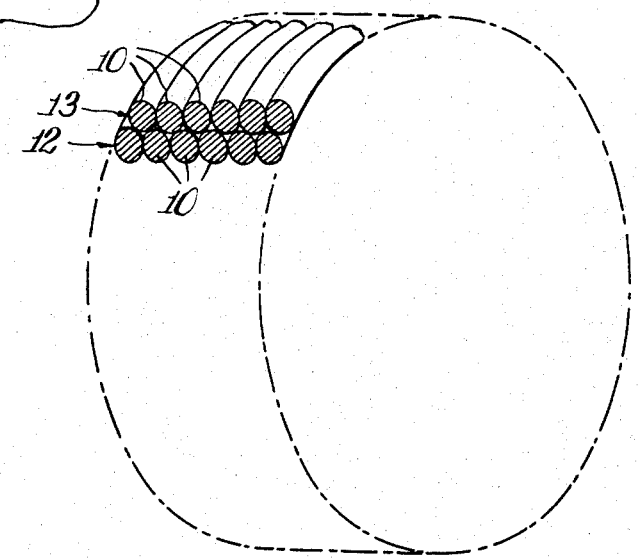
FIGURE 2 is a perspective view of another form of bead constructed in accordance with the present invention.
Figure 2A:
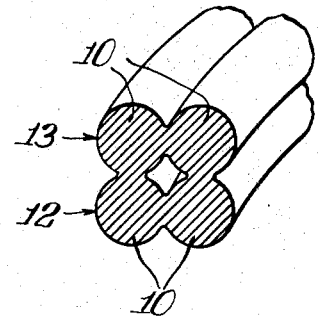
FIGURE 2A is an enlarged view of a portion of the bead of FIGURE 2.

In FIGURES 2 and 2A there is shown another embodiment of the invention. In this embodiment the wire 10 of round cross-section and composed of any suitable ferrous or non-ferrous metal for a tire bead is wound in a plurality of superposed layers, such as at 12 and 13 and into annular configuration in the form of a tire bead. Again, any desired number of layers of any desired number of convolutions for each layer may be formed as required for a given bead. After winding of the wire 10 the wound wire is sintered so that at least the touching portions of the several convolutions and layers are homogeneously joined as typically illustrated in FIGURE 2A. Thereafter, the annulus thus formed may be insulated for incorporation with a tire bead in the manner above noted.

It will be understood that the wires 8 and 10 are of round cross sections so that they may, by known heat treatment methods be provided with high tensile strength.

It will be noted in accordance with the present invention that several convolutions homogeneously connected together as above described provide a bead of substantially greater tensile strength for a given cross sectional area than beads embodying insulated wire or strip materials of the prior art.

The invention claimed is:

1. A tire bead comprising wire of round cross section disposed in a plurality of superposed touching layers and in which each layer comprises a plurality of convolutions in touching side-by-side relation, and the adjacent touching portions of said wire in said conovolutions and said layers being homogeneously joined together.

2. The tire bead of claim 1 characterized by said wire having a coating thereon with said adjacent touching portions of said wire being homogeneously joined by said coating.

3. The tire bead of claim 1 characterized by said adjacent touching portions of said wire being sintered.

References Cited

UNITED STATES PATENTS

| | | | |
|---|---|---|---|
| 1,943,274 | 1/1934 | Lerch | 245—1.5 |
| 1,981,893 | 11/1934 | Abbott | 245—1.5 |
| 2,149,079 | 2/1939 | White et al. | 245—1.5 |
| 2,952,293 | 9/1960 | Billingsley | 245—1.5 |
| 3,106,952 | 10/1963 | Rudder | 245—1.5 |
| 3,170,662 | 2/1965 | Anderson | 245—1.5 |

FOREIGN PATENTS 1,251,403   12/1960   France.

CHARLES W. LANHAM, *Primary Examiner.*